(12) United States Patent
Noordegraaf et al.

(10) Patent No.: US 8,173,247 B2
(45) Date of Patent: May 8, 2012

(54) LIGHTWEIGHT HIGH STIFFNESS COMPOSITES HAVING CLASS A SURFACE FINISH

(75) Inventors: Dirk Aart Noordegraaf, Roosendaal (NL); Rudolf Nuss, Baiersdorf (DE)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/994,291

(22) PCT Filed: Jun. 3, 2009

(86) PCT No.: PCT/IB2009/052351
§ 371 (c)(1),
(2), (4) Date: Nov. 23, 2010

(87) PCT Pub. No.: WO2009/147633
PCT Pub. Date: Dec. 10, 2009

(65) Prior Publication Data
US 2011/0070431 A1    Mar. 24, 2011

Related U.S. Application Data

(63) Continuation of application No. 12/131,957, filed on Jun. 3, 2008, now abandoned.

(51) Int. Cl.
*B32B 7/02* (2006.01)
(52) U.S. Cl. ......... 428/213; 428/214; 428/209; 428/119
(58) Field of Classification Search .......... 428/119, 428/214, 213, 209; 156/60, 308.2
See application file for complete search history.

(56) References Cited

U.S. PATENT DOCUMENTS

| | | | | |
|---|---|---|---|---|
| 3,600,330 | A | * | 8/1971 | Schneble, Jr. et al. ....... 106/1.11 |
| 5,648,125 | A | * | 7/1997 | Cane ............... 427/534 |
| 6,280,814 | B1 | * | 8/2001 | Offermann et al. ............. 428/69 |
| 6,451,434 | B1 | * | 9/2002 | Ebisawa et al. ............... 428/432 |
| 6,521,331 | B1 | | 2/2003 | Sikorski et al. |
| 7,678,295 | B2 | * | 3/2010 | Elkovitch et al. ............. 252/500 |
| 7,820,274 | B2 | * | 10/2010 | Ohta et al. .................... 428/209 |
| 2001/0023008 | A1 | * | 9/2001 | Offermann et al. .......... 428/119 |
| 2007/0172636 | A1 | * | 7/2007 | Smith et al. ................ 428/195.1 |
| 2009/0311497 | A1 | * | 12/2009 | Aoki ............................ 428/214 |

FOREIGN PATENT DOCUMENTS

DE    19909675 A1    9/2000

OTHER PUBLICATIONS

International Search Report; International Application No. PCT/IB2009/052351; International Filing Date: Jun. 3, 2009; Date of Mailing: Oct. 29, 2009; 6 Pages.
Written Opinion of the International Searching Authority; International Application No. PCT/IB2009/052351; International Filing Date: Jun. 3, 2009; Date of Mailing: Oct. 29, 2009; 6 Pages.
Wood, "Automotive Composites: Taking Subjectivity Out of Class A Surface Evaluation", Composites World [Online], Downloaded Jan. 9, 2012; http://www.compositesworld.com/articles/automotive-composites-taking-subjectivity-out-of-class-a-surface-evaluation, 4 Pages.
Hayden et al., "Meeting Class A Finish Requirements on Plastic Substrates", SAE Technical Paper Series, Congress and Esposition Cobo Hall, Detroit., Feb. 25-29, 1980, 6 Pages.

* cited by examiner

*Primary Examiner* — N. Edwards
(74) *Attorney, Agent, or Firm* — Cantor Colburn LLP

(57) ABSTRACT

Stiff, lightweight composite materials that include a Class A surface finish as well as methods of making these composites and articles that include these composites. The fiber reinforced HPPC composite sheet material includes a glass laminate layer and a metal layer. The metal layer covers the unidirectional glass fibers in the HPPC composite while the glass laminate layer gives the composite mechanical puncture resistance, while providing a composite sheet material with Class A surface properties that is still lightweight.

16 Claims, No Drawings

LIGHTWEIGHT HIGH STIFFNESS COMPOSITES HAVING CLASS A SURFACE FINISH

FIELD OF INVENTION

The present invention relates to polymer composite materials and, in particular, to lightweight, high stiffness composite sheet materials having a Class A surface finish and methods of making these composite sheet materials and articles including these composite sheet materials.

BACKGROUND OF INVENTION

The use of high performance thermoplastic composite (HPPC) sheet materials in many automotive applications has increased due to the characteristics of the HPPC material. These sheet materials are an improvement over conventional composite sheet materials, which were generally made to include glass or carbon fibers in a matrix of a thermoset, an epoxy or a polyester material.

HPPC materials, conversely, use a thermoplastic base rather than a thermoset, with continuous glass fibers as the stiffening material. These materials do not sag as compared to standard composite sheet materials and generally provide the same stiffness as a piece of aluminum sheet metal.

However, HPPC sheet materials generally do not provide very good aesthetic properties on their surface, which limits their use in many applications wherein the aesthetics of the piece are as important as their functionality, such as for body panels. One solution to obtain a class A surface for an HPPC sheet material has been to cover the HPPC sheet materials with a thermoplastic foil. However, in these embodiments, the unidirectional glass fiber in the HPPC is visible in high gloss applications. This is caused by the different thermal expansions between the glass matrix and thermoplastic material in between. Painting the part still does not remedy these problems.

Another solution is combining a HPPC sheet material, such as Azdel SuperLight (SL), with thin (0.1-0.3 mm) aluminum foils. In these embodiments, the outer surface has similar thermal expansion as the glass matrix, hence these products can provide a class A finish. The drawbacks of these composite sheet materials are that these thin foils are easily punctured with sharp objects making them unsuitable for many of the applications where this is likely to happen. Also dent resistance is likely to be reduced.

Accordingly, it would be beneficial to provide a stiff, lightweight composite sheet material that has a better surface finish than prior art composite sheet materials without one or more of the problems associated with prior art solutions. It would also be beneficial to provide a method of making a stiff, lightweight composite sheet material that has a better surface finish than prior art composite sheet materials.

SUMMARY OF THE INVENTION

The present invention addresses the issues associated with the prior art by providing a stiff, lightweight composite sheet material that includes a Class A surface finish as well as methods of making the these composite sheet materials and articles that include these composite sheet materials. The present invention includes a fiber reinforced HPPC composite sheet material that includes a glass laminate layer and a metal layer to provide a Class A surface quality and enough mechanical puncture strength to meet most structural requirements. The metal layer covers the unidirectional glass fibers in the HPPC composite while the glass laminate layer gives the composite mechanical puncture resistance. The overall assembly is still lightweight.

Accordingly, in one aspect, the present invention provides a stiff, lightweight composite sheet material including a core layer having a first side and a second side and comprising a thermoplastic material and at least one fiber; a metal layer attached to the first side of the core layer; and a glass laminate layer attached to the second side of the core layer; wherein the composite sheet material has a Class A surface finish.

In another aspect, the present invention provides a method of manufacturing a stiff, lightweight composite sheet material, the method including the steps of providing a core layer having a first side and a second side and comprising a thermoplastic material and at least one fiber; attaching a metal layer to the first side of the core layer; and laminating a glass laminate layer to the second side of the core layer; wherein the composite sheet material has a Class A surface finish.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of." Furthermore, all ranges disclosed herein are inclusive of the endpoints and are independently combinable. Reference throughout the specification to "one embodiment", "another embodiment", "an embodiment", "one aspect", "another aspect", and so forth, means that a particular element (e.g., feature, structure, and/or characteristic) described in connection with the embodiment is included in at least one embodiment/aspect described herein, and may or may not be present in other embodiments/aspects. In addition, it is to be understood that the described elements may be combined in any suitable manner in the various embodiments/aspects.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

The present invention provides a stiff, lightweight composite material that includes a Class A surface finish as well as methods of making these composites and articles that include these composites. The HPPC sheet material is a fiber reinforced HPPC composite sheet material that includes at least one glass laminate layer for providing stiffness and/or enough mechanical puncture strength to meet most structural requirements, and a metal layer to provide a Class A surface quality finish. The overall assembly is still lightweight.

The HPPC sheet material includes at least three layers, each designed to provide different characteristics to the composite sheet material. In a first aspect, the HPPC sheet material includes a core layer. The core layer includes a thermoplastic resin and at least one fiber. The fiber provides stiffness and/or impact strength to the core layer, thereby providing stiffness and/or impact strength to the HPPC sheet material. The HPPC sheet material also includes a glass laminate layer on one side of the core layer. The glass laminate layer is designed to provide resistance to the HPPC sheet material. The HPPC sheet material also includes a metal layer on the other side of the core layer. The metal layer covers the fibers in the core layer and helps provide a Class A surface finish to the HPPC sheet material. In an alternative embodiment, the HPPC sheet material includes a second glass laminate layer located between the metal sheet layer and the core layer. The second glass laminate layer also provides additional stiffness to the HPPC sheet material as well as providing additional puncture resistance to the HPPC sheet material.

Accordingly, in one aspect, the present invention provides a HPPC sheet material that includes a core layer that includes a thermoplastic resin. In one embodiment, a suitable thermoplastics resin includes, but is not limited to, polyethylene, polypropylene, polystyrene, acrylonitrylstyrene, butadiene, polyethyleneterephthalate, polybutyleneterephthalate, polybutyleneterachlorate, and polyvinyl chloride, both plasticised and unplasticised, and blends of these materials with each other or other polymeric materials. Other suitable thermoplastic resins include, but are not limited to, polyarylene ethers, polycarbonates, polyestercarbonates, thermoplastic polyesters, polyetherimides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds, high heat polycarbonate, high temperature nylon, and silicones, as well as alloys and blends of these materials with each other or other polymeric materials. It is anticipated that any thermoplastic resin can be used that is capable of being sufficiently softened by heat to permit fusing and/or molding without being chemically or thermally decomposed may be used in the present invention.

In addition to the organic polymer base resin, the composite materials of the present invention also include at least one fiber designed to help provide strength to the core layer and, therefore, to the composite sheet material. Fibers suitable for use in the invention include glass fibers, carbon fibers, graphite fibers, synthetic organic fibers, particularly high modulus organic fibers such as para- and meta-aramid fibers, nylon fibers, polyester fibers, or any of the thermoplastic resins mentioned above that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural an/or synthetic fibers, ceramic fibers, or mixtures thereof. The fiber content in the core layer may be from 15% to 85% in one embodiment and from 45% to 60%, by weight of the core layer in an alternative embodiment.

In one embodiment, the fibers in the core layer are shorter than 7 millimeters, although these shorter fibers may not provide adequate support to the core layer depending on the intended use of the HPPC sheet material. In another embodiment, the fibers in the core layer may be longer than 200 millimeters, although these longer fibers may need additional processing time to form the core layer and, therefore, the HPPC sheet material. Accordingly, in beneficial embodiments of the present invention, the fibers used in the core layer have a length between 7 and 200 millimeters and, in an alternative embodiment, have a length between 10 and 75 millimeters. In addition to their length, the fibers in the core layer have, in one embodiment, an average diameter between 7 and 25 microns and, in an alternative embodiment, an average diameter between 10 and 20 microns.

In one embodiment, the core layer comprises a Superlight® material available from Azdel, Inc. In this embodiment, the core layer is a low density glass mat thermoplastic composite (GMT). Beneficially, the areal density of the GMT is from 400 grams per square meter of the GMT ($g/m^2$) to 4000 $g/m^2$, although the areal density may be less than 400 $g/m^2$ or greater than 4000 $g/m^2$ depending on the specific application needs. Beneficially, the upper density should be less than 4000 $g/g/m^2$.

The Superlight® core layer is generally prepared using chopped glass fibers, a thermoplastic resin and a thermoplastic polymer film or films and or woven or non-woven fabrics made with glass fibers or thermoplastic resin fibers such as polypropylene (PP), polybutylene terephthalate (PBT), polyethylene terephthalate (PET), polycarbonate (PC), a blend of PC/PBT, or a blend of PC/PET. Generally, PP, PBT, PET, and PC/PET and PC/PBT blends are the thermoplastic resins. To produce a low density GMT, the materials and other additives are metered into a dispersing foam contained in an open top mixing tank fitted with an impeller. The foam aides in dispersing the glass fibers and thermoplastic resin binder. The dispersed mixture of glass and thermoplastic resin is pumped to a head-box located above a wire section of a paper machine via a distribution manifold. The foam, not the glass fiber or thermoplastic resin, is then removed as the dispersed mixture passes through a moving wire screen using a vacuum, continuously producing a uniform, fibrous wet web. The wet web is passed through a dryer to reduce moisture content and to melt the thermoplastic resin. When the hot web comes out of the dryer, a thermoplastic film may be laminated into the web by passing the web of glass fiber, thermoplastic resin and thermoplastic polymer film or films through the nip of a set of heated rollers. A non-woven and/or woven fabric layer may also be attached along with or in place thermoplastic film to one side or to both sides of the web to facilitate ease of handling the glass fiber-reinforced mat. The Superlight® core layer may then be passed through tension rolls and continuously cut (guillotined) into the selected size for later forming into an end product article.

In addition to the core layer, the HPPC sheet materials of the present invention include a glass laminate layer designed to provide stiffness and puncture resistance to the sheet material. The glass laminate layer includes a plurality of substantially unidirectional reinforcing glass fibers bonded together by a thermoplastic resin. By "unidirectional" it is meant that fibers are aligned substantially parallel to each other so that the longitudinal axis of fibers are substantially parallel. As used herein, "substantially parallel" refers to fibers that have an angle among themselves and wherein the angle does not deviate more than 10 degrees on average. Further, the glass laminate layer is substantially free of fiber cross-over where an angle that a cross-over fiber makes with the longitudinal axis of the aligned fibers is equal to or greater than 30 degrees. In those HPPC sheet materials embodiments that include a second or more glass laminate layers, adjacent glass laminate layers include reinforcing glass fibers that are unidirectional in each glass laminate layer but the aligned glass fibers in glass laminate layer may be arranged at an angle to the aligned glass fibers in the adjacent glass laminate layer. This angle can range from 0 degrees to 90 degrees.

The glass laminate layer is, in one embodiment, a prepreg structure that is formed by impregnating a resin on and around the aligned glass fibers. Various methods of forming a prepreg structure may be utilized, including without limitation, solution processing, slurry processing, direct impregnation of a fiber tow with molten polymer, fiber co-mingling, sintering of thermoplastic powder into a fiber tow, and the like. Such techniques are generally known in the art.

The thermoplastic resin used in the glass laminate layer may be selected from the thermoplastic resins described above as suitable for use in the core layer. The thermoplastic resin in the core layer may be the same as or different from the thermoplastic resin in the glass laminate layer. In those embodiments wherein multiple glass laminate layers are used, the thermoplastic resin in one glass laminate layer may also be the same as or different from the thermoplastic resin any other glass laminate layer.

While the glass laminate layer is described as using glass fibers, it is to be understood that, in alternative embodiments and depending on the intended use of the HPPC sheet material, alternative fibers may be used in lieu of or in addition to the glass fibers. These alternative fibers may be selected from the fibers previously described as being suitable for the core layer.

The glass laminate layer may be attached to the core layer during the manufacturing process of the core layer or the glass laminate layer can be attached prior to forming an article using the HPPC sheet material. Without limitation, the glass laminate layer can be attached to the core layer by laminating the glass laminate layer to the core layer, sonic welding of the glass laminate layer to the core layer, or simply laying the glass laminate layer across the core layer before the article forming process. Other suitable techniques known in the art may also be used.

In addition to the core layer and the glass laminate layer, the HPPC sheet materials of the present invention also include a metal layer designed to provide a Class A surface finish to the HPPC sheet material. The metal layer, in one embodiment, is a thin metal layer having a thickness of 0.01 to 0.5 mm. In another embodiment, the metal layer has a thickness of 0.1 to 0.4 mm. In yet another embodiment, the metal layer has a thickness of 0.2 to 0.3 mm.

The metal layer may be selected from any metal capable of providing a Class A surface finish to the HPPC sheet material. Exemplary metals include, but are not limited to, aluminum, copper, steel, or a combination thereof.

The metal layer may be bonded to the core layer or, in an alternative embodiment, a glass laminate layer, using any method capable of bonding a metal layer to a thermoplastic layer. In one embodiment, an adhesive is used to bond the metal layer to the core layer or glass laminate layer. Exemplary adhesives include, but are not limited to, thermoplastic adhesives, including pressure sensitive adhesives and hot melt adhesives, such as polyamides, modified polyolefins, urethanes and polyolefins. Metal layers pre-manufactured with an adhesive layer can be used and bonded to the HPPC structure during the part forming process.

In alternative embodiments, the metal layer may include one or more additional treatment steps depending on the potential use of the finished substrate. For example, in one embodiment, the metal layer may include a corrosion treatment that is applied prior to joining the metal layer. In an alternative embodiment, the metal layer may include a primer layer applied to an external side of the metal layer to enable the metal layer to be subsequently painted. In yet another embodiment, the metal layer may include all such treatments, such as a corrosion protection treatment, an adhesive and/or a primer. Still other treatments capable of being used with metal layers may be used in alternative embodiments.

As discussed, the composite materials of the present invention may be used in a wide variety of applications wherein the stiff, lightweight material is used in an aesthetic application such that the advantages of the Class A surface finish may be utilized. Examples of such applications include, but are not limited to, building infrastructure, aircraft, train and naval vessel side wall panels, ceiling panels, cargo liners, office partitions, elevator shaft lining, ceiling tiles, recessed housing for light fixtures and other such applications that are currently made with honeycomb sandwich structures, thermoplastic sheets, and FRP.

The composite sheet materials according to the present invention may be molded into various articles using methods known in the art including, for example, pressure forming, thermal forming, thermal stamping, vacuum forming, compression forming, and autoclaving.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims All citations referred herein are expressly incorporated herein by reference.

The invention claimed is:

1. A composite sheet material comprising:
   a core layer having a first side and a second side and comprising a thermoplastic material and a fiber;
   a metal layer attached to the first side of the core layer, wherein the metal layer comprises an aluminum metal layer having a thickness between 0.1 and 0.4 mm, wherein one side of the aluminum metal layer has been precoated with an adhesive, and wherein the aluminum metal layer has been pretreated with a corrosion protection treatment and the aluminum metal layer has been coated with a primer for subsequent painting operations on the other side from the adhesive; and
   a glass laminate layer attached to the second side of the core layer.

2. The composite sheet material according to claim 1, wherein the core layer comprises a thermoplastic resin selected from polyethylene, polypropylene, polystyrene, acrylonitrylstyrene, butadiene, polyethyleneterephthalate, polybutyleneterephthalate, polybutyleneterachlorate, polyvinyl chloride, polyphenylene ether, polycarbonates, polyestercarbonates, thermoplastic polyesters, polyetherimides, acrylonitrile-butylacrylate-styrenepolymers, amorphous nylon, polyarylene ether ketone, polyphenylene sulfide, polyaryl sulfone, polyether sulfone, poly(1,4 phenylene) compounds silicones or combinations including at least one of the foregoing resins.

3. The composite sheet material according to claim 1, wherein the fiber is selected from metal fibers, metalized inorganic fibers, metalized synthetic fibers, glass fibers, graphite fibers, carbon fibers, ceramic fibers, aramid fibers, or a combination including at least one of the foregoing fibers.

4. The composite sheet material according to claim 1, wherein the core layer comprises 20 to 80 percent by weight of the fiber and 20 to 80 percent by weight of the thermoplastic resin.

5. The composite sheet material according to claim 4, wherein the core layer comprises 35 to 55 percent by weight of the fiber and 45 to 65 percent by weight of the thermoplastic resin.

6. The composite sheet material according to claim 1, wherein the glass laminate layer comprises a plurality of substantially unidirectional reinforcing glass fibers bonded together by a thermoplastic resin.

7. The composite sheet material according to claim 1, further comprising a second glass laminate layer between the core layer and the metal layer.

8. The composite sheet material of claim 7, wherein both the glass laminate layer and the second glass laminate layer comprises a plurality of substantially unidirectional reinforcing glass fibers bonded together by a thermoplastic resin and wherein the glass laminate layers are oriented such that the substantially unidirectional reinforcing glass fibers of one glass laminate layer are substantially perpendicular to the substantially unidirectional reinforcing glass fibers of the other glass laminate layer.

9. A method of manufacturing a composite sheet material, the method comprising:
   providing a core layer having a first side and a second side and comprising a thermoplastic material and a fiber;
   attaching a metal layer to the first side of the core layer, wherein the metal layer comprises an aluminum metal layer having a thickness between 0.1 and 0.4 mm, wherein one side of the aluminum metal layer has been precoated with an adhesive, and wherein the aluminum metal layer has been pretreated with a corrosion protection treatment and the aluminum metal layer has been coated with a primer for subsequent painting operations on the other side from the adhesive; and
   laminating a glass laminate layer to the second side of the core layer.

10. The method of claim 9, further comprising laminating a second glass laminate layer to the first side of the core layer before laminating the metal layer to the second glass laminate layer.

11. The method of claim 10, wherein both the glass laminate layer and the second glass laminate layer comprises a plurality of substantially unidirectional reinforcing glass fibers bonded together by a thermoplastic resin and wherein the glass laminate layers are oriented such that the substantially unidirectional reinforcing glass fibers of one glass laminate layer are substantially perpendicular to the substantially unidirectional reinforcing glass fibers of the other glass laminate layer.

12. The method according to claim 9, wherein the core layer comprises a thermoplastic resin selected from polyethylene, polypropylene, polystyrene, acrylonitrylstyrene, butadiene, polyethyleneterephthalate, polybutyleneterephthalate, polybutyleneterachlorate, polyvinyl chloride, polyphenylene ether, polycarbonates, polyestercarbonates, thermoplastic polyesters, polyetherimides, acrylonitrile-butylacrylate-styrene polymers, amorphous nylon, polyarylene ether ketone, polyphenylene sulfide, polyaryl sulfone, polyether sulfone, poly(1,4 phenylene) compounds silicones or combinations including at least one of the foregoing resins.

13. The method according to claim 9, wherein the fiber is selected from metal fibers, metalized inorganic fibers, metalized synthetic fibers, glass fibers, graphite fibers, carbon fibers, ceramic fibers, aramid fibers, or a combination including at least one of the foregoing fibers.

14. The method of claim 9, wherein the glass laminate layer comprises a plurality of substantially unidirectional reinforcing glass fibers bonded together by a thermoplastic resin.

15. The composite sheet material according to claim 1, wherein the fiber has a length of 10 to 75 mm.

16. A visible automotive article including the composite sheet material according to claim 1.

* * * * *